(12) United States Patent
Akers et al.

(10) Patent No.: US 6,278,967 B1
(45) Date of Patent: Aug. 21, 2001

(54) AUTOMATED SYSTEM FOR GENERATING NATURAL LANGUAGE TRANSLATIONS THAT ARE DOMAIN-SPECIFIC, GRAMMAR RULE-BASED, AND/OR BASED ON PART-OF-SPEECH ANALYSIS

(75) Inventors: Glenn A. Akers; Susumu Kuno, both of Belmont, MA (US)

(73) Assignee: LogoVista Corporation (JP)

( * ) Notice: Subject to any disclaimer, the term of this patent is extended or adjusted under 35 U.S.C. 154(b) by 0 days.

(21) Appl. No.: 09/171,242

(22) PCT Filed: Apr. 23, 1996

(86) PCT No.: PCT/US96/05567

§ 371 Date: Dec. 16, 1998

§ 102(e) Date: Dec. 16, 1998

(87) PCT Pub. No.: WO97/40452

PCT Pub. Date: Oct. 30, 1997

Related U.S. Application Data

(63) Continuation-in-part of application No. 07/938,413, filed on Aug. 31, 1992.

(51) Int. Cl.[7] .............................. G06F 17/28; G06F 17/27
(52) U.S. Cl. ........................................ 704/2; 704/9; 704/7
(58) Field of Search .................................. 704/2, 3, 4, 5, 704/6, 7, 8, 9, 10, 1; 707/536, 532, 531

(56) References Cited

U.S. PATENT DOCUMENTS

| | | | |
|---|---|---|---|
| 4,641,264 | * 2/1987 | Nitta et al. | 704/4 |
| 4,791,587 | 12/1988 | Doi | 704/2 |
| 4,805,100 | 2/1989 | Ozeki | 704/1 |
| 4,833,611 | 5/1989 | Fukumochi et al. | 704/5 |
| 4,916,614 | 4/1990 | Kaji et al. | 704/2 |
| 4,958,285 | 9/1990 | Tominaga | 704/8 |

(List continued on next page.)

FOREIGN PATENT DOCUMENTS

| | | |
|---|---|---|
| 0357344 | 8/1989 | (EP) . |
| WO 97/40452 | * 10/1997 | (WO) . |
| WO 97/40453 | * 10/1997 | (WO) . |

OTHER PUBLICATIONS

Stanley Y.W. SU, "Heuristic Algorithms For Path Determination In A Semantic Network", IEEE Cat. No. 0730–3157/90/0000/0587, 1990, pp. 587–592.

Spiegel, M.R., "Theory And Problems Of Probability And Statistics", Schaum's Outline Series, Chapter 3, p. 76.

Cormen, T.H. et al., Introduction To Algorithms—16—Dynamic Programming, The Mit Press/Mcgraw–Hill Book Company, pp. 301–314.

Gazdar, Gerald, *Natural Language Processing In Prolog—An Introduction—To Computational Linguistics—*7.2 "Feature Structures As Graphs" Addison–Wesley Publishing Company, pp. 221–226.

Sobashima et al.,"A Corpus–based Local Context Analysis for Sproken Dialogues", Speech Communications, pp. 205–212.

(List continued on next page.)

Primary Examiner—Joseph Thomas
(74) Attorney, Agent, or Firm—Testa, Hurwitz & Thibeault, LLP

(57) ABSTRACT

Systems and methods for automated natural language translation take source natural language and translate it into a target natural language. The language translation is facilitated through the use of domain specific dictionaries, controlling grammar rules, and probability values associated with some dictionary entries. Domain specific dictionaries provide different translations of words depending on the context in which the words are used. Controlling grammar rules are used to supersede all other grammar rules to eliminate inaccurate and undesirable translations. Probability values are used to determine the likelihood a particular multi-word combination is a particular part of speech.

4 Claims, 12 Drawing Sheets

U.S. PATENT DOCUMENTS

| | | | |
|---|---|---|---|
| 4,964,044 | | 10/1990 | Kumano et al. .......................... 704/6 |
| 4,980,829 | | 12/1990 | Okajima et al. ......................... 704/5 |
| 4,984,178 | | 1/1991 | Hemphill .............................. 704/255 |
| 5,029,085 | | 7/1991 | Ito ........................................... 704/9 |
| 5,060,155 | | 10/1991 | van Zuijlen ............................. 704/9 |
| 5,136,503 | | 8/1992 | Takagi et al. ........................... 704/2 |
| 5,146,406 | * | 9/1992 | Jensen ..................................... 704/9 |
| 5,214,583 | | 5/1993 | Miike et al. ............................. 704/4 |
| 5,243,520 | | 9/1993 | Jacobs et al. ........................... 704/9 |
| 5,267,156 | * | 11/1993 | Nomiyama ............................. 704/10 |
| 5,268,839 | * | 12/1993 | Kaji ........................................ 704/3 |
| 5,289,375 | * | 2/1994 | Fukumochi et al. .................... 704/2 |
| 5,321,607 | | 6/1994 | Fukumochi et al. .................... 704/4 |
| 5,418,717 | * | 5/1995 | Su et al. .................................. 704/9 |
| 5,448,474 | | 9/1995 | Zamora ................................... 704/9 |
| 5,477,450 | * | 12/1995 | Takeda et al. .......................... 704/2 |
| 5,490,061 | * | 2/1996 | Tolin et al. ............................. 704/2 |
| 5,497,319 | | 3/1996 | Chong et al. ........................... 704/2 |
| 5,528,491 | * | 6/1996 | Kuno et al. ............................. 704/9 |
| 5,535,120 | * | 7/1996 | Chong et al. ........................... 704/3 |
| 5,541,836 | * | 7/1996 | Church et al. .......................... 704/7 |

OTHER PUBLICATIONS

PCT/US96/05567, International Search Report, 7 Pages.

PCT/US96/10283, International Search Report, 7 Pages.

Teller et al. paper, 1994, "A Probabilistic Algorithm for Segmenting Non–Kanji Japanese Strings", Natural Language Processing, pp. 742–747.

Abe et al. paper, 1986, "*A Kana–Kanji Translation System for Non–Segemented Input Sentences Based on Syntactic and Semantic Analysis*", Central Research Laboratory, Hitachi, Ltd., pp. 280–285.

* cited by examiner

AUTOMATED SYSTEM FOR GENERATING NATURAL LANGUAGE TRANSLATIONS THAT ARE DOMAIN-SPECIFIC, GRAMMAR RULE-BASED, AND/OR BASED ON PART-OF-SPEECH ANALYSIS

CROSS-REFERENCE TO RELATED APPLICATION

This is a continuation-in-part of U.S. patent application Ser. No. 07/938,413 filed Aug. 31, 1992.

TECHNICAL FIELD

The invention relates to translating automatically one natural language into another natural language, preferably English to Japanese.

BACKGROUND INFORMATION

Various schemes for the machine-based translation of natural language have been proposed. Typically, the system used for translation includes a computer which receives input in one language and performs operations on the received input to supply output in another language. This type of translation has been an inexact one, and the resulting output can require significant editing by a skilled operator. The translation operation performed by known systems generally includes a structural conversion operation. The objective of structural conversion is to transform a given parse tree (i.e., a syntactic structure tree) of the source language sentence to the corresponding tree in the target language. Two types of structural conversion have been tried, grammar-rule-based and template-to-template.

In grammar-rule-based structural conversion, the domain of structural conversion is limited to the domain of grammar rules that have been used to obtain the source-language parse tree (i.e., to a set of subnodes that are immediate daughters of a given node). For example, given

VP=VT01+NP (a VerbPhrase consists of a SingleObject Transitive Verb and a NounPhrase, in that order)
and Japanese: 1+2=>2+1

(Reverse the order of VT01 and NP), each source-language parse tree that involves application of the rule is structurally converted in such a wave that the order of the verb and the object is reversed because the verb appears to the right of its object in Japanese. This method is very efficient in that it is easy to find out where the specified conversion applies; it applies exactly at the location where the rule has been used to obtain the source-language parse tree. On the other hand, it can be a weak conversion mechanism in that its domain, as specified above, may be extremely limited, and in that natural language may require conversion rules that straddle over nodes that are not siblings.

In template-to-template structural conversion, structural conversion is specified in terms of input/output (I/O) templates or subtrees. If a given input template matches a given structure tree, that portion of the structure tree that is matched by the template is changed as specified by the corresponding output template. This is a very powerful conversion mechanism, but it can be costly in that it can take a long period of time to find out if a given input template matches any portion of a given structure tree.

SUMMARY OF THE INVENTION

The automated natural language translation system according to the invention has many advantages over known machine-based translators. After the system automatically selects the best possible translation of the input textual information and provides the user with an output (preferably a Japanese language translation of English-language input text), the user can then interface with the system to edit the displayed translation or to obtain alternative translations in an automated fashion. An operator of the automated natural language translation system of the invention can be more productive because the system allows the operator to retain just the portion of the translation that he or she deems acceptable while causing the remaining portion to be retranslated automatically. Since this selective retranslation operation is precisely directed at portions that require retranslation, operators are saved the time and tedium of considering potentially large numbers of incorrect, but highly ranked translations. Furthermore, because the system allows for arbitrary granularity in translation adjustments, more of the final structure of the translation will usually have been generated by the system. The system thus reduces the potential for human (operator) error and saves time in edits that may involve structural, accord, and tense changes. The system efficiently gives operators the full benefit of its extensive and reliable knowledge of grammar and spelling.

The automated natural language translations system's versatile handling of ambiguous sentence boundaries in the source language, and its powerful semantic propagation provide further accuracy and reduced operator editing of translations. Stored statistical information also improves the accuracy of translations by tailoring the preferred translation to the specific user site. The system's idiom handling method is advantageous in that it allows sentences that happen to include the sequence of words making up the idiom, without intending the meaning of the idiom, to be correctly translated. The system is efficient but still has versatile functions such as long distance feature matching. The system's structural balance expert and coordinate structure expert effectively distinguish between intended parses and unintended parses. A capitalization expert effectively obtains correct interpretations of capitalized words in sentences, and a capitalized sequence procedure effectively deals with multiple-word proper names, without completely ignoring common noun interpretations.

In one aspect, the invention is directed to an improvement of the automated natural language translation system, wherein the improvement relates to using an "automatic domain determiner" to aid translation. A domain can include any set of terms and/or patterns of usage attributed to a certain field of usage or to one or more particular people. For example, a domain can include business correspondence, marketing documents, computer-related writings, writings in a technical field such as physics, etc. A dictionary contains certain words which, when used in certain domains, have a translation in the target natural language (e.g., Japanese) which is different than it would be if the word(s) were used in another domain or if it was not used in any domain. A list of domain keywords is also used. The keywords are domain-specific words or terms that are associated with each domain and are used to determine if a particular sentence in the source natural language (or alternatively the whole source document) falls into one of the possible domains. The "automatic domain determiner" feature determines if there are enough keywords in the sentence (or whole document or some portion of the document) to warrant a finding that the sentence (or document) is within a particular domain. If it is within a domain, the translation of the sentence (or the entire document) is carried out using raised probability values of the words that are both listed in the dictionary and appear in the sentence (or entire document) being translated. The determination made by the "automatic domain determiner" is based solely on the source natural language and the keywords. The "automatic domain determiner" aspect of the invention excludes domain-misfit analyses (i.e., those that do not fit properly in a particular domain) from appearing in the resulting tree structure, and it helps to speed up the system's translation time.

In another aspect, the invention is directed to another improvement of the automated natural language translation system, wherein the improvement relates to parsing sentences of the source natural language using grammar rules which can be marked as "almighty," "POS-Exclusive," or unmarked. A grammar rule marked as "almighty" is a rule that blocks all other rules by which the same fragment of the sentence could be analyzed. A "POS-Exclusive" (POS means "part(s) of speech) rule blocks any other rule by which the same fragment of the sentence could be analyzed, but the POS-Exclusive rule only does so if the other rule has the same POS. An unmarked grammar rule has no priority over any other rules. Marking grammar rules as either "almighty" or "POS-Exclusive" is a very effective way to prune unnecessary parsing branches from the tree structure that would otherwise be created by the system's translation engine. This marking of grammar rules also makes parsing more efficient in terms of both time and memory requirements. That is, it can shorten system translation time because the translation engine does not have to create as large a set of possible tree structures as it might otherwise, and it can free up memory (e.g., RAM) because the translation engine does not need to store as big a tree structure as it might otherwise.

In yet another aspect, the invention is directed to yet another improvement of the automated natural language translation system, wherein the improvement relates to parsing using a dictionary having entries marked as highly or absolutely unlikely to be constituents of the final tree structure. The dictionary has multi-word entries, and at least one of those entries is marked with an extremely low probability value which indicates that it is least likely that the entry functions as the specified part of speech in the correct parse tree of any sentence in the source natural language. When the marked entry appears in a parse tree structure of a given input sentence, the probability of that parse tree being the correct one for the sentence is greatly reduced because of the low probability value associated with that marked entry. This use of probability values can have a pruning effect on the tree structure created by the system's translation engine.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
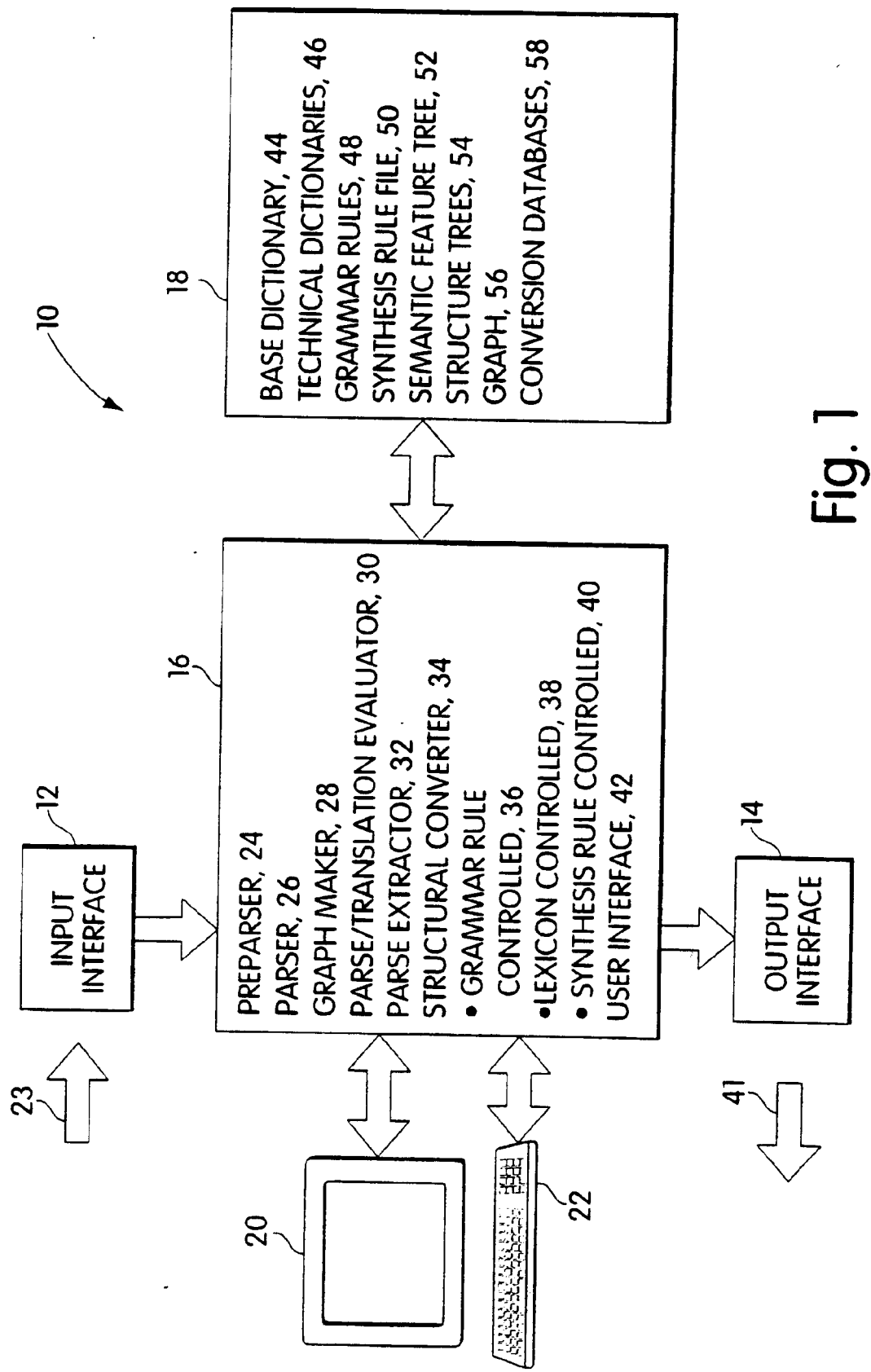
FIG. 1 is a block diagram illustrating a system for performing automated translation of natural language according to the invention.

A general description of an automated natural language translations system according to the invention is first provided below without reference to any of the drawings. After the general description of the system, reference will be made to the various drawings.

An automated natural language translation system can translate from a source natural language to a target natural language. In a preferred embodiment, the system translates from English to Japanese. The system comprises means for receiving and storing the source natural language, a translation engine for creating a translation into the target natural language, means for displaying the translation to a user, and means for obtaining for a user and displaying to a user alternative translations. In one embodiment of the system, the translation engine includes a preparer, a parser, a graph maker, an evaluator, a graph scorer, a parse extractor, and a structural converter. The preparer examines the input text and resolves any ambiguities in input sentence boundaries. The preparer then creates and displays the input text in a parse chart seeded with dictionary entries. The parser parses the chart to obtain possible syntactic categories for the input text. The graph maker produces a graph of the possible syntactic interpretations of the input text based on the parse chart. The graph includes nodes and subnodes which are associated with possible interpretations of the input text. The evaluator, which comprises a series of experts, evaluates the graph of the possible interpretations and adds expert weights to the nodes and subnodes of the graph. The graph scorer uses the expert weights to score the subnodes, and the graph scorer then associates the N best scores with each node. The parse extractor assigns a parse tree structure to the preferred interpretation as determined by the graph scorer. The structural converter performs a structural conversion operation on the parse tree structure to obtain a translation in the target language.

In the following three paragraphs, a description is provided of how: (a) the graph scorer combines the expert weights to compute a final weighted score for each subnode; (b) the graph scorer combines the subnode scores to arrive at a final node score; and (c) linguistic information is propagated through the tree of nodes and subnodes.

To compute the final weighted score for each subnode, the graph scorer associates a constant value with each subnode. An analysis of the linguistic information associated with each subnode determines the subnode score. See, for example, FIG. 8 where a series of expert evaluators examine the linguistic information stored at each node and subnode. The graph scorer dds together the individual weighted scores for each expert to obtain a final weighted average for a particular node or subnode. The combination of a plurality of weighted scores into a single weighted average score is a standard problem in computer science. One method that can be used is to multiply each expert result by a constant number (weight) assigned to that expert. The weight assigned to each expert is a matter of design choice. The designer can choose the priority (weight) to assign each expert. The weighted average is the summation of a series of numbers wherein each number is multiplied by a constant. For example, $$\text{weighted average} = (w_1)(x_1) + (w_2)(x_2) + \ldots + (w_n)(x_n)$$

where the weights, $x_1, w_2, \ldots w_n$, are all nonnegative and add up to 1. See, for example, Spiegel, *Theory and Problems of Probability and Statistics* 76 (McGraw-Hill, Inc. 1975) which discusses the use of weighted averages in the context of statistical expectations.

To combine subnode scores to obtain a final node score, the graph scorer can propagate the subnode scores from the bottom of the graph up to the top of the graph. Given the graph, wherein each node has a set of N scores, it is possible to determine one or more propagation methods. One technique which can be used to propagate the subnode scores is memorization which is a type of dynamic-programming used to solve optimization problems. The solution to optimization problems can involve many possible values (outcomes). The task is to find the optimal value. The algorithm used in optimization solves every sub subproblem just once and saves the outcome, thus avoiding the need to recompute the answer every time the sub subproblem is encountered. For a more detailed explanation of memorization as applied to optimization problems, see, for example, Cormen et al., *Introduction to Algorithms* 301–314 (McGraw-Hill Book Co. 1990). The method described at pages 301, 302, and 312 of *Introduction to Algorithms* is one method that can be used for propagating subnode score information through the graph.

In propagating linguistic information through the tree, the semantic propagation part of the system operates to propagate semantic information from smaller constituents to the larger constituents that they comprise. Semantic propagation applies to the four classes of syntactic categories (SEMNP, SEMVP, SEMADJ, and VERB) used in the parsing operation. Before semantic propagation can occur, the linguistic information stored at the nodes must be analyzed. The analysis of the semantic information stored at the nodes is guided by a set of rules that tell from examining the noun-like and verb-like constituents in a grammar rule which selectional restriction slots of the verb-like constituents apply to which noun-like objects. Gerald Gazdar discusses in his text *Natural Language Processing In Prolog* (Addison-Wesley Publishing Co., 1989) a set of rules which can be used to analyze the semantic information stored at the nodes in a directed acyclic graph similar to that disclosed in the specification. Gazdar discusses the use of feature matching to match information on adjacent nodes. Gazdar states that feature matching involves equations that say that certain features appearing on one node must be identical to the features appearing on another. Most current work assumes a principle that is responsible for equating one class of feature specifications as they appear on the mother category and the daughter which manifests the morphology associated with those features. This daughter is known as the "head" of the phrase. Most phrases only have a single head. Thus, for example, a verb phrase inherits the tense of its verb since the latter is the head of the verb phrase. There is no straightforward way of specifying this principle on a grammar-wide basis with the notational resources that we have used so far, but we can stipulate the effects of the principle on a rule-by-rule basis quite simply if we assume that the relevant features are all to be found on a single branch of the DAG. Let us call the label on this branch head. Then we can write a typical VP rule as follows:

VP→V NP PP

<V head>=<VP head>

This requires that the value of the head feature on the V and that on the mother VP be identical.

The rules discussed in Gazdar can be easily adapted for each of the syntactic categories discussed herein. The linguistic information assigned to each node using Gazdar's rules can be propagated through the tree using memorization techniques.

Thus, summarizing the previous three paragraphs, the weighted average is one method of determining the subnode score, each subnode score can be propagated through the graph using known memorization techniques as applied to optimization problems, and the strategy discussed in Gazdar's text can be used to analyze the linguistic information stored at each node and this linguistic information can be propagated through the parse tree chart using memorization techniques.

The automated natural language translation system can perform automated re-translation functions after the initial automatic translation. That is, after the system automatically selects the best possible translation of the input textual information and provides the user with an output (preferably a Japanese language translation of the input English text), the user can then interface with the system to edit the displayed translation or to obtain alternative translations in an automated fashion.

The automated natural language translation system uses a linguistic model which breaks a sentence into substrings. A substring is one or more words which occur in the order specified as part of the sentence. For instance, substrings of "The man is happy" include "The," "The man," "man is happy," "is," and "The man is happy" itself, but not "is man," "man man," and "The is."

Different linguistic models classify substrings in various ways and in different levels of detail. For instance, in "They would like an arrow," "an arrow" is typically classified as a noun phrase (NP). Some models would also classify "an arrow" with syntactic features (for instance, it is a singular noun phrase), and semantic features (it refers to a weapon). If the phrase is ambiguous, there may be two or more ways of classifying it. For instance, "an arrow" can also refer to a symbol with an arrow-like shape. When linguistic models provide a method for resolving ambiguity, they usually do so by combining smaller units into larger units. When evaluating a larger unit, these models consider only a portion of the information contained in the larger unit.

In an exemplary embodiment of the system, the semantic property of "an arrow" (symbol vs. weapon) is used in evaluating the verb phrase "like an arrow" in the sentence "They would like an arrow." In contrast, if the syntax of the phrase "an arrow" were changed as in "He shot it with an arrow," the semantic property of "an arrow" is not used in evaluating the verb phrase "shot it with an arrow."

For any substring of a sentence interpreted in a single way with regard to a specific linguistic model (an interpreted substring), exported properties exist. Exported properties are all properties used to evaluate the combination of an interpreted substring with other units to form larger substrings. An export is an interpreted substring interpreted together with its exported properties. Properties that are contained within the interpreted substring but not exported are called substructures.

The parser of the system includes a grammar database. The parser finds all possible interpretations of a sentence using grammatical rules. The grammar database consists of a series of context-free phrase structure rules of the form X=A1 A2 . . . An. X is composed of, or made from, A1 A2 . . . An and is referred to as a higher node of lower nodes (subnodes) A1 through An.

The graph maker of the system graphically represents the many possible interpretations of a sentence. Each node of the graph corresponds to an export of some substring. In one embodiment of the system, a single export is represented by a single node. The graph contains arcs which emanate from the nodes associated with an export. The arcs represent the substructure of the export based on the application of grammar rules. The graph may depict at least two types of arcs: (1) a unary arc which points to a single different export of the same substring; (2) a binary arc which includes a pair of pointers which points to two exports, the substrings of which when concatenated form the substring of the original export. Note that the formulation described in (2) assumes a grammar in Chomsky normal form. Amended claim 35 applies to grammars not in Chomsky normal form by rephrasing type (2) to reflect an arc having an N-tuple of pointers, pointing to N exports.

The graph also includes a single starting export S from which all portions of the graph can be reached by following a series of arcs. The starting export corresponds to the entire sentence.

Multiple arcs emanate from a node if and only if the same export can be composed of one or more exports (the pair of pointers in a binary arc is not considered multiple arcs for this purpose). Multiple arcs point to a node if and only if that export is a component of multiple exports. A node with no arcs projecting from it corresponds to a dictionary entry assigned to the substring.

A plurality of linguistic experts assign a numerical score to a set of exports. The linguistic experts apply the score to each node of the graph. In one embodiment of the system, a scoring array (where each element of the array is a weight to multiply by a particular expert's score) is a fixed length "N" of floating point numbers for any given sentence.

The score is evaluated by a scoring module which may be integrated with the graph-making engine and/or the parser.

Scores are computed for all exports that make up a higher export. The score for the higher export is computed as the sum of the exports that make up the higher level export and the scores of any experts that apply to the combination such as a score assigned by the structural balance expert.

The order in which nodes are visited and scored is a standard depth-first graph-walking algorithm. In this algorithm, nodes that have been scored are marked and are not scored again. During the scoring process, the scoring module evaluates dictionary entry nodes before evaluating any of the higher unit nodes. Each dictionary entry gives rise to a single score.

Multiple scores result where there are multiple ways of making an export, i.e., k ways of making the export result in k possible scores. Multiple scores are handled as follows:

(1) For a unary rule, each of the k scores of the lower export is added to the expert values that apply to the unary rule, and the resulting vector of k scores is associated with the parent export.

(2) For a binary rule, assume that the left child has g scores and the right child has h scores. Then a total of g times h scores are computed by adding each of the left child's scores to each of the right child's scores, and in addition, adding the expert values that apply to the binary rule. When g times h exceeds N, only the N best scores are kept with the parent node.

(3) When a node's export can be created in multiple ways, at most N scores are added to that node's score list, the best scores being kept.

When scoring is complete, the above methods assure that each export has associated with its node a set of g scores (g ranging from 1 to N) which represent the g most likely ways (relative to the linguistic model) of making the export, including all substructure properties which are not represented in the export. In the special case of the root node S, the scoring method gives rise to the g most likely ways of making the sentence.

Each score in each score list described above has an associated pointer. The pointer provides information to indicate which score(s) of the score list of lower export(s) were combined to produce the higher level score. By following the respective pointers, the g most likely interpretations of the sentence can be extracted as unambiguous parse trees.

Further details of the automated natural language translation system will now be disclosed with reference to FIGS. 1–9. Various improvements according to the invention are described thereafterwith reference to FIGS. 10, 11, and 12.

Figure 2:
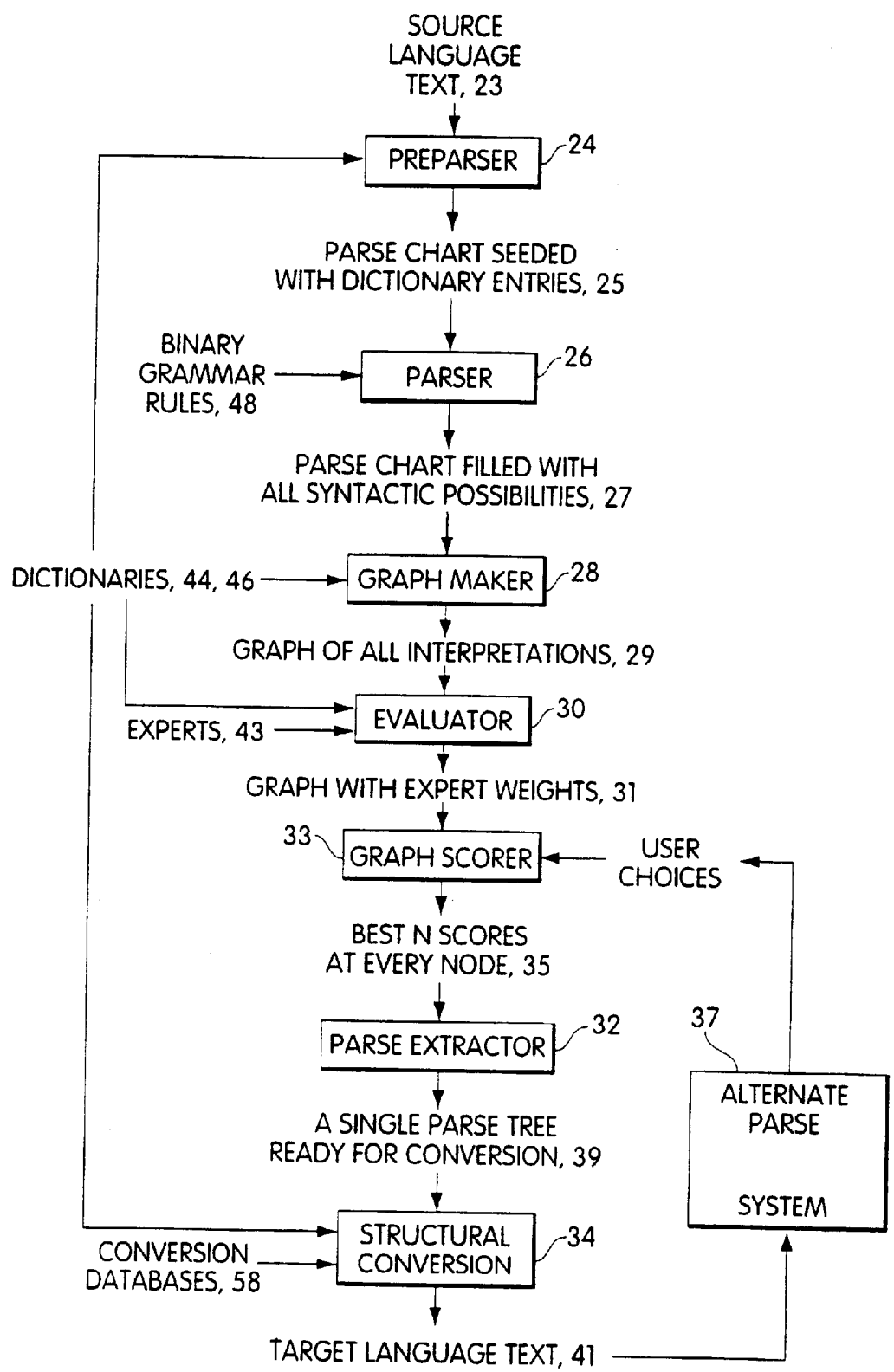
FIG. 2 is a data flow diagram illustrating overall functioning of the system of FIG. 1.

Referring to FIGS. 1 and 2, an automated natural language translation system 10 according to the invention includes an input interface 12, a translation engine 16, storage 18, a user input device 22, a display 20, and an output interface 14. The input interface is constructed to receive a sequence of text in a source language, such as English. The input interface may comprise a keyboard, a voice interface, or a digital electronic interface, such as a modem or a serial input. The translation engine performs translation operations on the source text, in conjunction with data in storage. The translation engine may be comprised entirely of hardwired logic circuitry, or it may contain one or more processing units and associated stored instructions. The engine may include the following elements, or parts of them: A preparser 24, a parser 26, a graph maker 28, a parse/translation evaluator 30, a parse extractor 32, a structural converter 34, and a user interface 42, which includes an alternate parse system 37. The structural converter may comprise a grammar rule controlled structural converter 36, a lexicon controlled structural converter 38, and a synthesis rule controlled structural converter 40. The storage 18 may include one or more areas of disk (e.g., hard, floppy, and/or optical) and/or memory (e.g., RAM) storage, or the like. It may store the following elements, in whole or in part: a base dictionary 44, technical dictionaries 46, user-created dictionaries, grammar rules 48, synthesis rules 50, a semantic feature tree 52, structure trees 54, and a graph 56. The storage 18 also is used to store input textual information in a source natural language, output textual information in a target natural language, and all sorts of information used or useful in performing the translation including one or more dictionaries, domain keywords, and grammar rules. The user input interface 22 may comprise a keyboard, a mouse, touchscreen, light pen, or other user input device, and is to be used by the operator of the system. The display may be a computer display, printer or other type of display, or it may include other means of communicating information to the operator. The output interface 14 communicates a final translation of the source text in the target language, such as Japanese. The interface may comprise a printer, a display, a voice interface, an electronic interface, such as a modem or serial line, or it may include other means for communicating that text to the end user.

Figure 3:
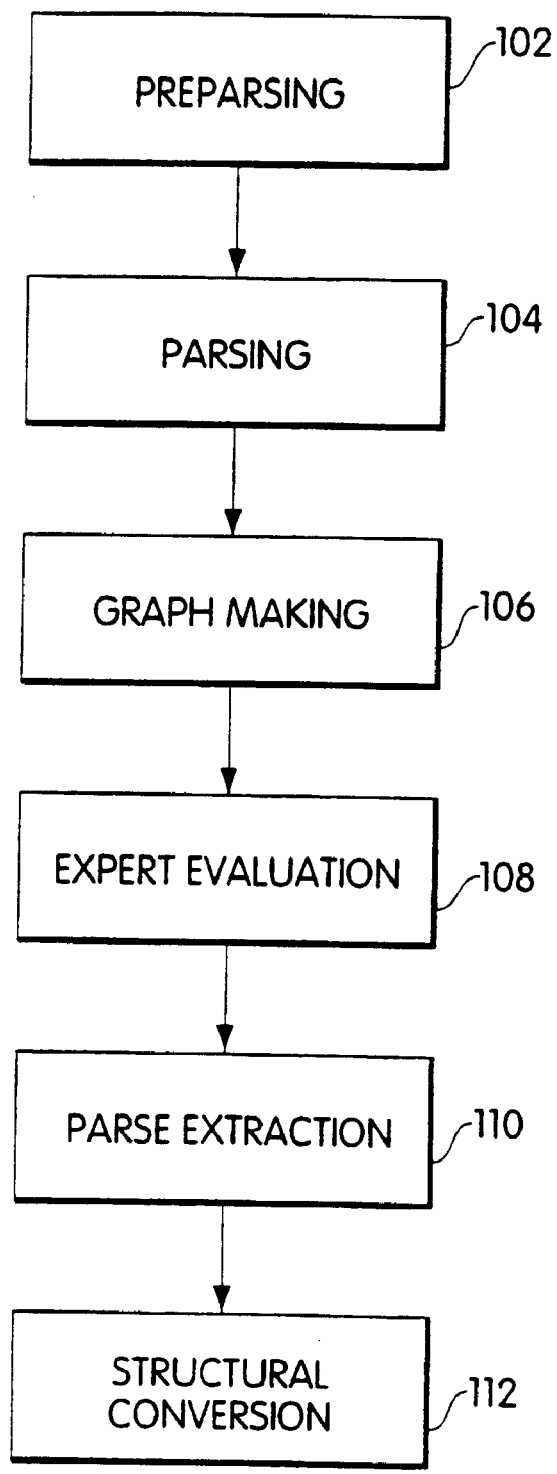
FIG. 3 is a flow diagram illustrating the operation of the system of FIG. 1.

In operation of one embodiment of the translation system of the invention, referring to FIGS. 1, 2 and 3, the preparser 24 first performs a preparsing operation (step 102) on the source text 23. This operation includes the resolution of ambiguities in sentence boundaries in the source text, and results in a parse chart seeded with dictionary entries 25. The parser 26 then parses the chart produced by the preparser (step 104), to obtain a parse chart filled with syntactic possibilities 27. The graph maker 28 produces a graph of possible interpretations 29 (step 106), based on the parse chart resulting from the parsing step. The evaluator 30, which accesses a series of experts 43, evaluates the graph of stored interpretations (step 108), and adds expert weights to the graph 31. The graph scorer 33 scores nodes and associates the N (e.g., 20) best scores with each of them 35. The parse extracter 32 assigns a parse tree structure 39 to this preferred interpretation (step 110). The structural converter 34, which accesses the conversion tables 58, then performs a structural conversion operation (step 112) on the tree to obtain a translation 41 in the target language. The user may interact with the alternate parse system 37 to obtain alternative translations.

Figure 4:
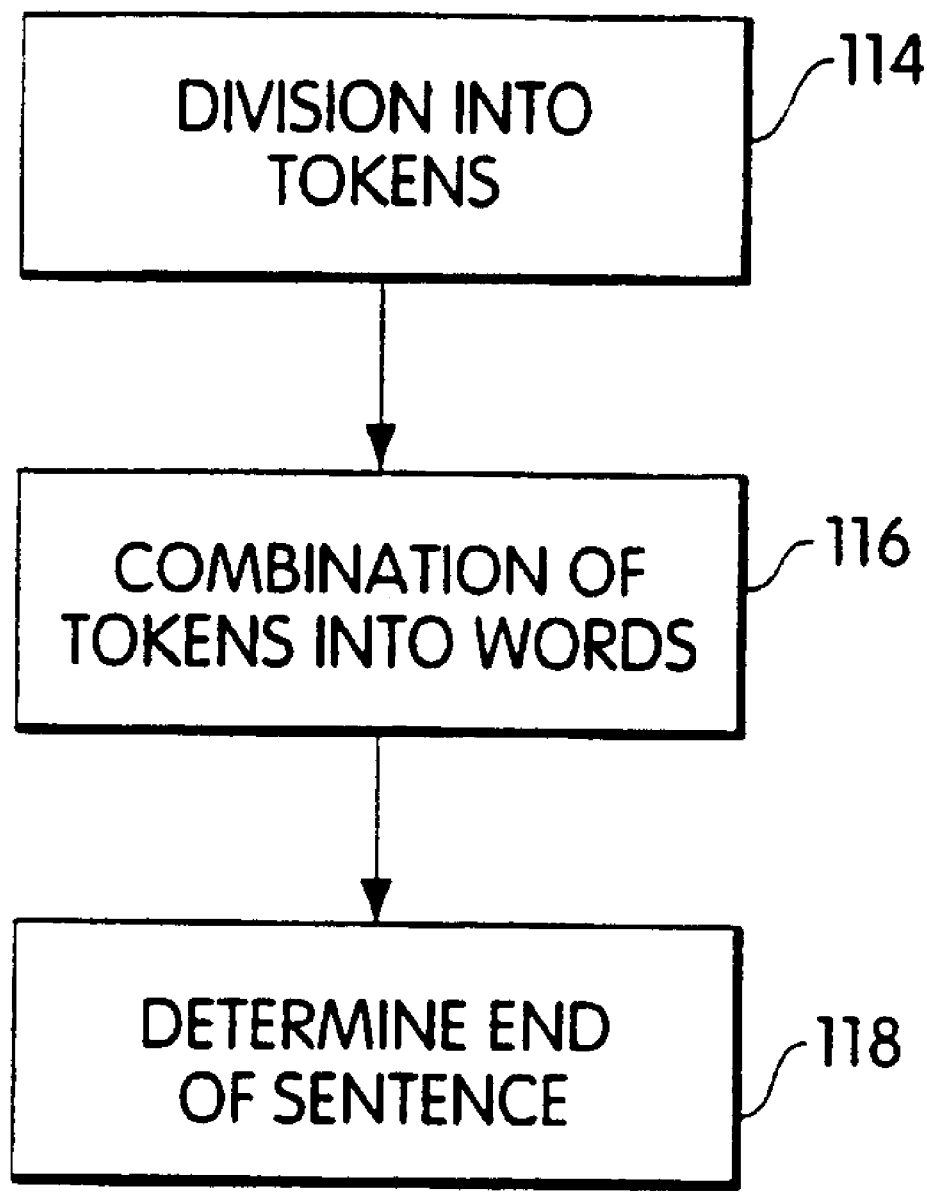
FIG. 4 is a flow diagram illustrating the operation of the end-of-sentence function of the preparer of the system of FIG. 1.

Referring to FIG. 4, the system begins the preparsing operation by dividing the input stream into tokens (step 114), which include individual punctuation marks, and groups of letters that form words. The occurrence of whitespace affects the interpretation of characters at this level. For instance, in "x - y" the "-" is a dash, but in "x-y" it is a hyphen.

The preparser then combines the tokens into words (step 116). At this level, it recognizes special constructions (e.g., internet addresses, telephone numbers, and social security numbers) as single units. The preparser also uses dictionary lookup to find groupings. For example, if "re-enact" is in the dictionary as "reenact" it will become one word in the sentence, but if it is not, then it will remain as three separate "words".

The next preparsing phase involves determining where the sentence ends (step 118). During this operation, the preparser accesses the base dictionary and the technical dictionaries, and any user-created dictionaries, as it follows a sequence of steps for each possible sentence ending point (i.e., after each word of the source text). The preparser need not perform these steps in the particular order presented, and these may be implemented as a series of ordered rules or they may be hard-coded.

Figure 5:
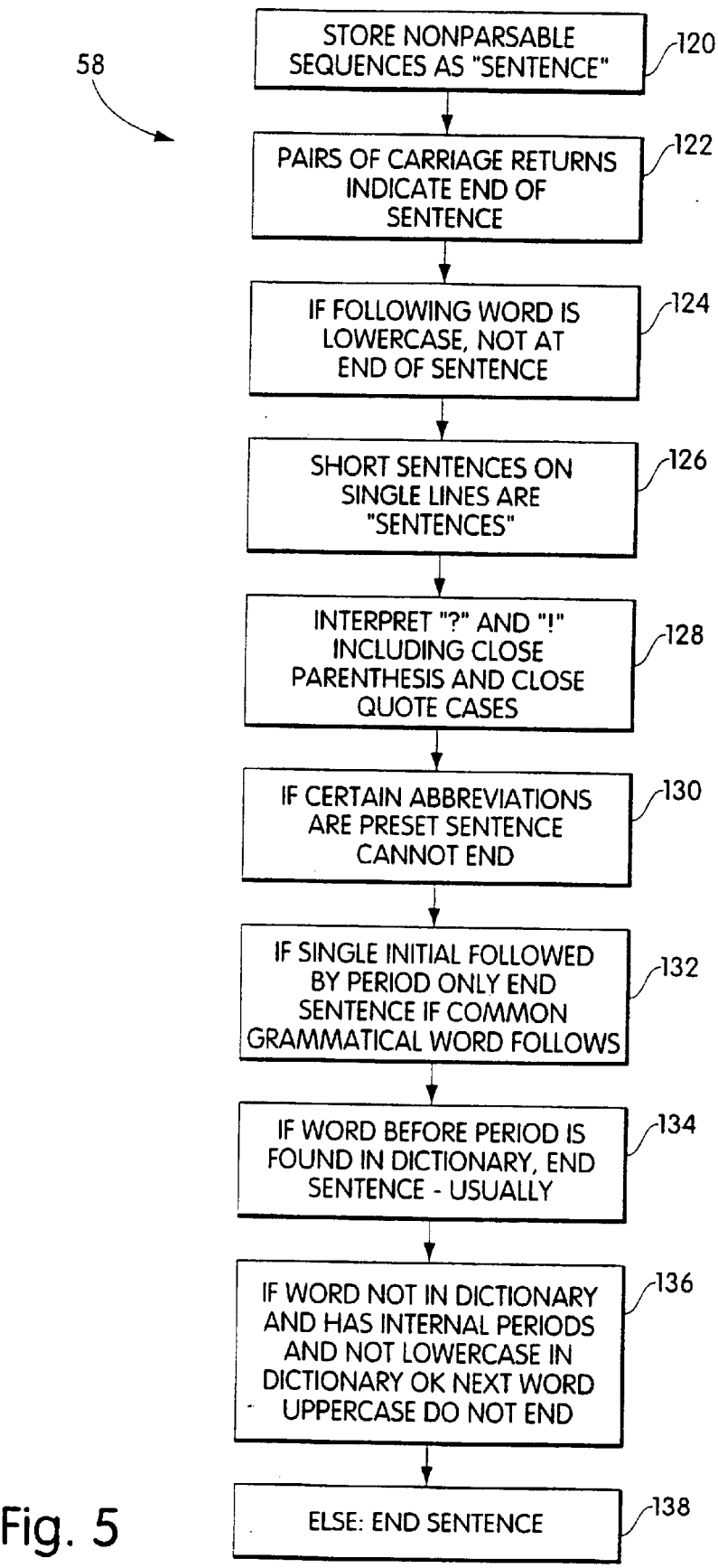
FIG. 5 is a flow diagram illustrating the operation of the parser of the system of FIG. 1.

Referring to FIG. 5, the preparser interprets and records any nonparsable sequence of characters, such as a series of dashes: "-----", as a "sentence" by itself, although not one which will be translated (step 120). The preparser also requires any sequence of two carriage returns in a row to be the end of a sentence (step 122). If the first letter of the next word is a lower case letter, the preparser will not indicate the end of a sentence (step 124). If a sentence started on a new line and is short, the preparser considers it a "sentence" of its own (e.g., a title).

The preparser interprets a period, a question mark, or an exclamation mark as the end of a sentence, except in certain situations involving end parenthesis and end quotes (step 128). In the case of sentences that ends with" or ?" or the like, the preparser uses virtual punctuation marks after the quote in addition to the punctuation before the quote. Alternatives for the underlying punctuation required for ?" are illustrated in the following examples:

The question was "What do you want?".

Did he ask the question "What do you want?"?

Are you concerned about "the other people"?

In English, each of these is likely to end with?" The virtual punctuation marks added by the preparser indicate that before the quote there is something which can be either a question mark or nothing at all. After the quote there is something that can be either a period or a question mark. The grammatical structure of the rest of the sentence allows later processing stages to select the best choice.

The preparser may also use several further approaches in preparsing a period (steps 130, 132, 134, 136, and 138). Some abbreviations in the dictionary are marked as never beginning sentences and others as never ending sentences (step 130). These rules are always respected. For example, "Ltd" never begins a sentence and "Mr" never ends one. The preparser also will not end a sentence with a single initial followed by a period unless the next word is a common grammatical word (step 132) such as "the", "in", etc. If the word before the period is found in any dictionary, the period will end the sentence (step 134). If the word before the period is not in this dictionary, and it has internal periods (e.g., I.B.M.) and the next word is not in the dictionary in a lowercase form, or the word after that is itself uppercase, then this is not an end of sentence (step 136). In remaining cases the period does mark the end of sentence (step 138).

Referring again to FIGS. 2 and 3, once the sentence boundaries have been defined by the preparser, the parser places the words of the sentence in syntactic categories, and applies grammar rules from the grammar database to them to compute possible syntactic interpretations of the sentence (step 104). These grammar rules 48 can be implemented as a series of computer readable rules that express the grammatical constraints of the language. For the English language, there may be hundreds of such rules, which may apply to hundreds of syntactic categories. To reduce the computational overhead of this operation, the different possible meanings of a word are ignored.

In the next step (step 106), the graph maker employs the dictionary to expand the results of the parser to include the different meanings of words and creates a directed acyclic graph representing all semantic interpretations of the sentence. This graph is generated with the help of a series of semantic propagation procedures, which are described below. These procedures operate on a series of authored grammar rules and, in some cases, access a semantic feature tree for semantic information. The semantic feature tree is a tree structure that includes semantic categories. It is roughly organized from the abstract to the specific, and permits the procedures to determine how semantically related a pair of terms are, both in terms of their separation in the tree and their levels in the tree. For example, "cat" and "dog" are more related than "cat" and "pudding", and hence the former pair would be separated by a smaller distance within the tree. "Animal" and "cat" are examples of words that are stored at different levels in the tree, as "animal" is a more abstract term than "cat."

Figure 9:
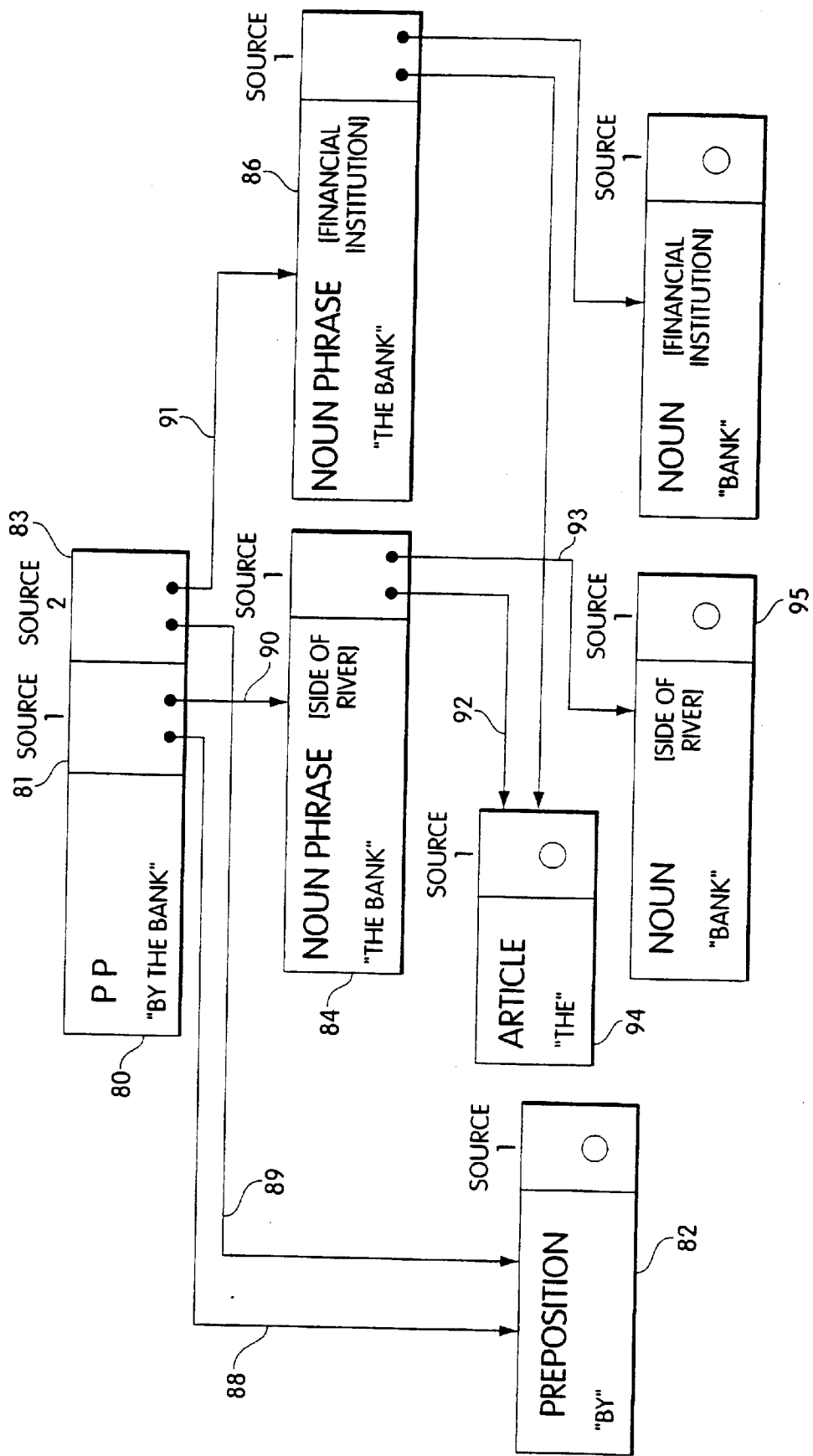
FIG. 9 is a diagram of a sample graph used by the system of FIG. 1 for the exemplary phrase "by the bank".

Referring to FIG. 9, the graph includes nodes 80 and their subnodes 82, 84, 86 linked by pointers 88, 89, 90, 91 in a manner that indicates varous types of relationships. A first type of relationship in the graph is one where nodes represeting phrases possess pointers to constituent word nodes or sub-phrase nodes. For example, a noae 84 representing the phrase "the bank" will be linked by pointers 92, 93 to the constituent words "the" 94, and "bank" 95. A second type of relationship in the graph is where phrase interpretations possess pointers to alternate ways of aking the same higher-level constituent from lower-level pieces. For example, a node 80 epresenting the phrase "by the bank" can have two source interpretation locations 81, 83, which each include pointers 88 & 89, 90 & 91 to their respective constituents. In this example, the different constituents would include different subnodes 84, 86 that each represent different meanings for the phrase "the bank". The structure of the graph is defined by the results of the parsing operation and is constrained by the syntax of the source sentence. The nodes of the graph are associated with storage locations for semantic information, which can be filled in during the process of semantic propagation.

The semantic propagation part of the system operates to propagate semantic information from smaller constituents to the larger constituents they comprise. It applies to four classes of the syntactic categories used in the earlier parsing operation: SEMNP (which includes noun-like objects and prepositional phrases), SEMVP (verb phrase like objects, which usually take subjects), SEMADJ (adjectives) and VERB (lexical verb-like verbs that often take objects). Other syntactic categories are ignored within a rule. The grammar rule author may also override the implicit behavior below by specific markings on rules. These specific instructions are followed first.

There are two aspects to the manner in which semantic features are propagated through the system. The first is a set of rules that tell from examining the noun-like and verb-like constituents in a grammar rule, which selectional restriction slots of the verb-like constituents apply to which noun-like objects. For instance, the rule for the verb phrase of the sentence: "I persuaded him to go" is roughly VP =VT11 +NP +VP (where VP is a verb phrase, VT11 is a type of transitive verb, and NP is a noun phrase). One exemplary default rule indicates that when a verb takes objects, selectional restrictions are to be applied to the first NP encountered to the right of the verb. Another rule says that VP restrictions on their subjects should be applied to the first NP found to the left of a VP. Together these rules make sure that "persuade him" and "him go" are both evaluated for their semantic plausibility. As mentioned before, these rules reflect the complex grammar of the English language and there may therefore be quite a few of them.

Figure 6:
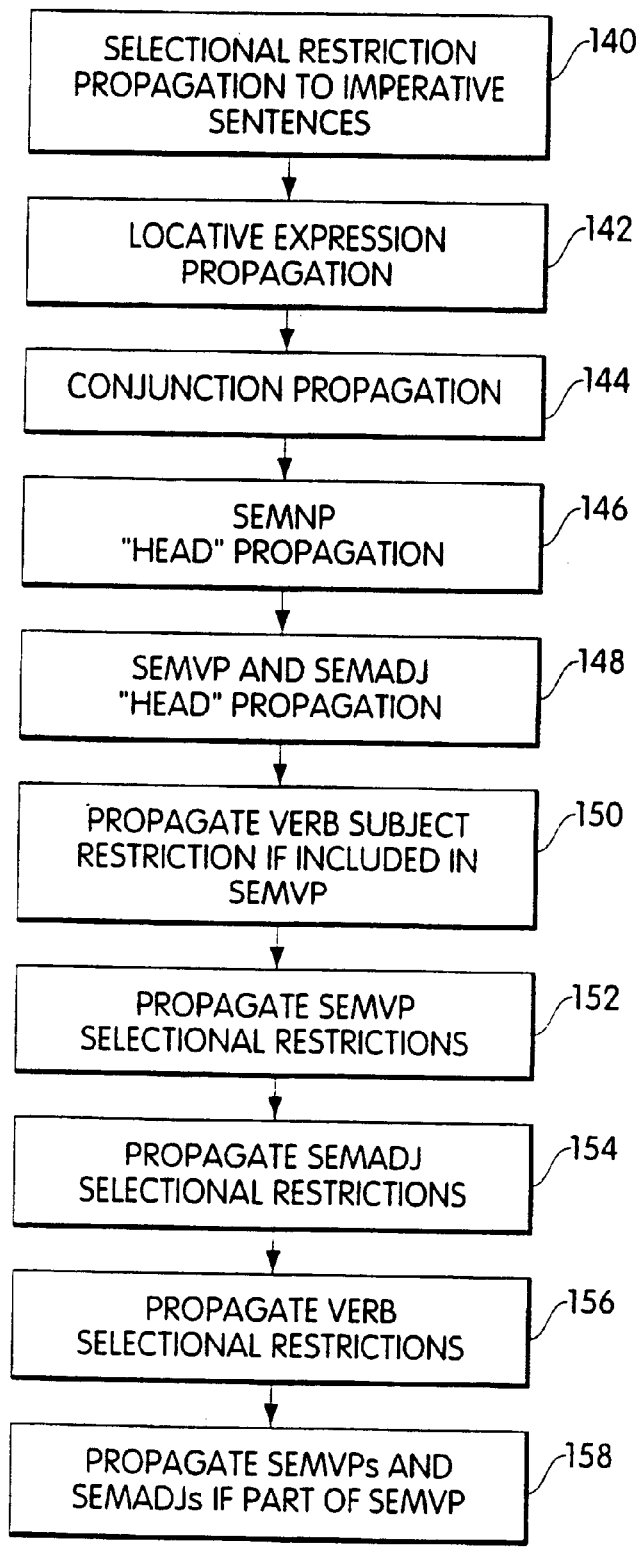
FIG. 6 is a flow diagram illustrating the semantic propagation operations of the system of FIG. 1.

Referring to FIG. 6, the semantic propagation operation includes copying of selectional restrictions from SEMVPs to imperative sentences (step 140). If a SEMNP is being used as a locative expression, its goodness is evaluated against semantic constants defining good locations (step 142). If a rule involves a conjunction of two SEMNPs (detected because of ANDing together of syntactic features), the graph maker ANDs together the semantic features and applies the semantic distance expert (step 144).

If, in the course of examining the rules specified for syntactic feature propagation, the graph maker locates a "head" SEMNP which gets propagated to a higher level (e.g., it becomes part of a SEMNP that includes more words), it propagates semantic features as well (step 146). However, if the "head" is a partitive word (e.g., "portion," "part"), it propagates from a SEMNP to the left or right instead. SEMVPs and SEMADJs are propagated in the same way, with the only exception being that SEMVPs and SEMADJs do not have any partitive situations (step 148). Adjectives are part of the SEMVP class for this purpose.

When a SEMVP is made from a rule including VERBs, the graph maker propagates upward the VERB's subject restriction unless the VP is a passive construction, in which case the VERB's first object restriction is propagated instead (step 150). In any rule containing SEMVPs, it attempts to apply the selectional restrictions of the SEMVPs to NPs encountered moving leftward from the SEMVP (step 152). In any rule containing SEMADJs, the graph maker attempts to apply the selectional restriction of the SEMADJ first to any SEMNPs encountered moving to the right from the SEMADJ, and if that fails, tries moving to the left (step 154).

For any remaining unused object selectional restrictions of a VERB (that have not been propagated upward because of passives), the graph maker applies them in turn to SEMNPs encountered in order to the right of the VERB (step 156). In all of these rules, a verb selectional restriction is used up as soon as it applies to something. In all rules up to this one, SEMNPs are not used up when something applies to them. Starting at this rule, the SEMNP does get "used up". Finally, if a rule makes a SEMVP, the graph maker determines if there are any SEMVPs or SEMADJs in it that have not yet been used, and if so, propagates them upward (step 158).

The system also performs feature matching of linguistic features. Linguistic features are properties of words and other constituents. Syntactic feature matching is used by the parser, and semantic feature matching is used by the graph maker. But the same techniques are used for both. For instance, "they" has the syntactic feature plural, while "he" has the feature of singular. Feature matching uses marking on grammar rules so that they only apply if the features of the words they are to apply to meet certain conditions. For example, one rule might be:

S=NP{@}+VP{@} where the @ signs mean that the number features of the NP and VP must match. So while this rule will allow "they are" and "he is", it will not allow "they is" and "he are".

Feature match restrictions are broken into "local" and "long distance". The long distance actions may be computed when the grammar is compiled, rather than when actually processing a sentence. The sequence of long distance operations that must be performed is then encoded in a series of instruction bytes.

The computation of long distance feature operations must start with an n-ary rule (i.e., one that may have more than two inputs on its right). The system then distributes codes to various binary rules so that feature sets end up being propagated between rules in the correct fashion. By breaking the n-ary rules into binary rules, the parsing operations are greatly simplified, but because the system keeps track of feature sets across binary rules, it retains the power of the long distance operations.

The system of the invention also allows multiword "idioms" as part of the dictionary, while retaining representations of the individual words of which they are composed. These two forms may ultimately compete against each other to be the best representation. For instance "black sheep" is found in the dictionary with the meaning of a disfavored person. But in some cases the words "black sheep" may refer to a sheep which is black. Because both of the forms are retained, this non-idiomatic usage may still be chosen as the correct translation.

The idioms may belong to further categorizations. For example, the system may use the following three types:

Almighty: United States of America
Preferential: long ago
Normal: black sheep

Almighty idioms suppress any other possible interpretation of any of the words that make up the sequence. Preferential idioms suppress other constituents of the same general type and that use the very same words. Normal idioms compete on an even footing with other entries.

The resulting graph is to be evaluated by experts (step 108, FIG. 3), which provide scores that express the likelihood of correctness of interpretations in the graph. The system of the invention includes a scoring method that applies to all partial sentences of any length, not just full sentences. An important element in the use of a graph is that a subtree is fully scored and analyzed only once, even though it may appear in a great many sentences. For example, in the phrase "Near the bank there is a bank.", the phrase "Near the bank" has at least two meanings, but the best interpretation of that phrase is determined only once. The phrase "there is a bank" similarly has two interpretations, but the best of those two is determined only once. There are therefore four sentence interpretations, but the subphrases are scored just once. Another feature of the graph is that each node is labeled with easily accessible information about the length of that piece of the sentence. This allows the best N interpretations of any substring of the English sentence to be found without reanalyzing the sentence.

Although, in one implementation, only the N overall best analyses of the sentence are available at any one time (N being a number on the order of 20), the use of a graph allows the system to integrate the result of a user choice about a smaller constituent and give a different N best analyses that respect the user's choice. Because all this is done without reparsing the sentence or rescoring any substrings, it may be done quickly.

Figure 8:
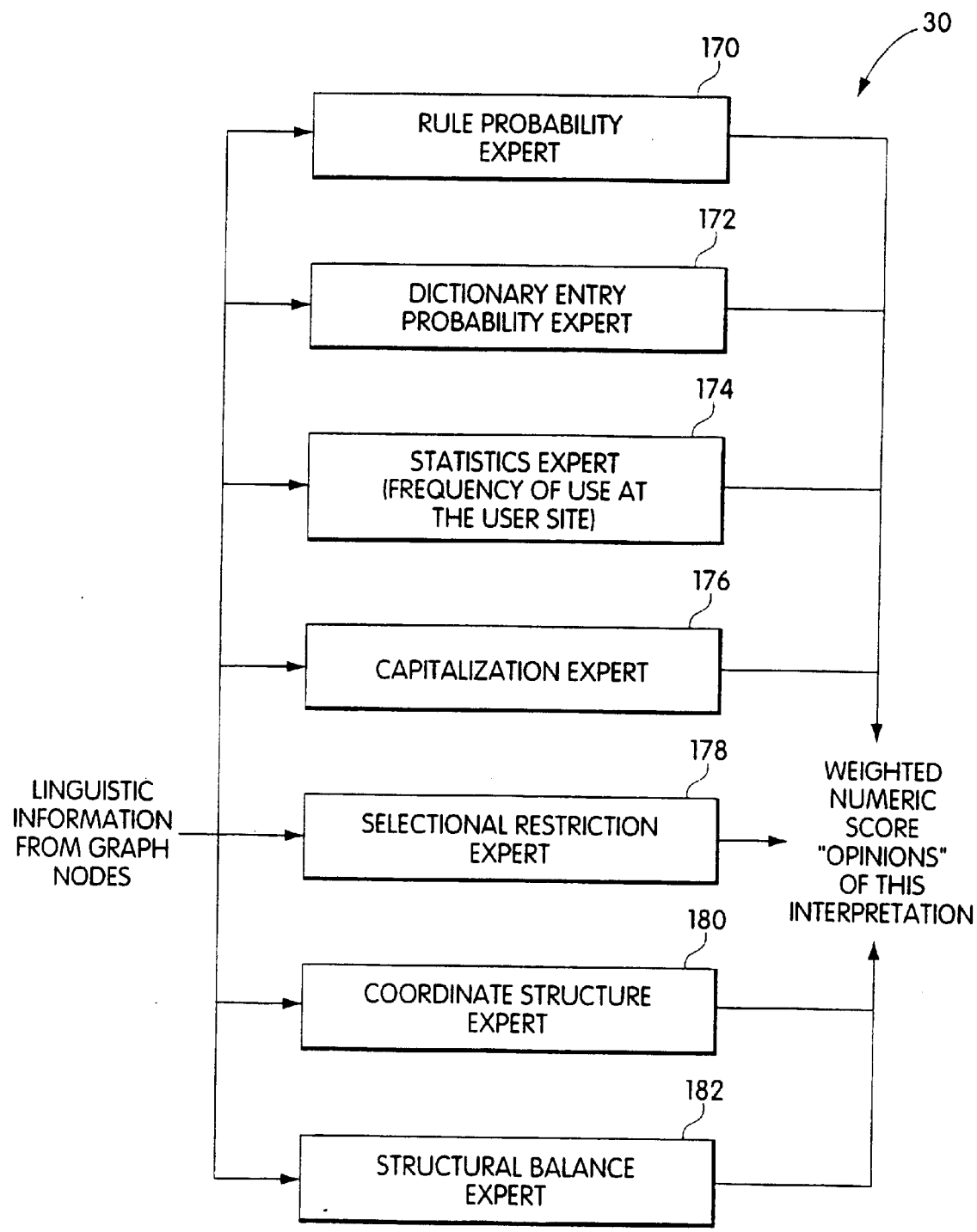
FIG. 8 is a flow diagram illustrating the expert evaluator of the system of FIG. 1.

Referring to FIG. 8, operation of the expert evaluator 30 is based on various factors that characterize each translation, which are handled by the various experts. The rule probability expert 170 evaluates the average relative frequency of grammar rules used to obtain the initial source language parse tree. The selectional restriction expert 178 evaluates the degree of semantic accord of the given translation. The dictionary entry probability expert 172 evaluates the average relative frequency of particular "parts of speech" of the words in the sentence used to obtain the initial source language parse tree. The statistics expert evaluates the average relative frequency of particular paraphrases chosen for the given translation.

The system automatically determines the English "part of speech" (POS) for various individual English words, English phrases, and groups of English words. The system makes the automatic determination of the POS when translating sentences, and the system usually makes the correct choice. Occasionally, however, the sentence being translated is itself ambiguous. A word or phrase that can be interpreted as more than one POS leads to several distinct but "correct" meanings for the sentence in which the word or phrase appears. It is possible for an operator of the system to override the system's automatic POS determination and instead manually set the POS for any word, phrase, or group of words. For example, in the source English sentence "John saw a boy with a telescope", an operator of the system can set "a boy with a telescope" as a Noun Phrase to force the system to interpret the sentence to mean that the boy was carrying a telescope and thus reject the interpretation that John used a telescope to see the boy. An operator can address the situation where overriding the system's POS rules yields worse, not better, translation results by applying a few manual POS settings as possible or by applying less restrictive manual POS settings. Noun Phrase is less restrictive than Noun, and Group is the least restrictive POS setting. The following is a list of the various possible POS settings.

PART OF SPEECH (POS)

Noun
Noun Phrase
Verb (transitive or intransitive)
Verb Phrase
Adjective
Adjectival Phrase
Adverb
Adverbial Phrase
Preposition
Prepositional Phrase
Conjunction
Group
English The parts of speech "Adjectival Phrase" and "Adverbial Phrase" are useful in the situation where an English sentence may have a different meaning depending on how a particular prepositional phrase is interpreted by the system. For example, the sentence "We need a book on the fourth of July" means "We need a book about the American fourth of July holiday" if "on the fourth of July" has an adjectival interpretation, but the sentence means "On the fourth day of July, we need a book" if the phrase "on the fourth of July" has an adverbial interpretation. If the operator believes the system has automatically assigned the incorrect POS to "on the fourth of July", the operator can manually set a different POS to "on the fourth of July" in the sentence "We need a book on the fourth of July". If an operator does not want the system to translate a particular word, phrase, or group of words from English to Japanese, the operator can assign the POS "English" to the desired word(s), phrase(s), and/or group(s) of words. It also is possible for an operator to remove one or more POS settings, regardless whether the settings were assigned automatically by the system or manually by an operator.

The system keeps track of statistical information from translation usage at each customer site at more than one level. For example, the system may maintain statistical counts at the surface form level (how often was "leaving" used as a transitive versus an intransitive verb), and also at the meaning level (did it mean "leave behind" or "depart" from), and this second type is summed over occurrences of "leave", "leaves", "left", and "leaving". The system may also keep statistical counts separately for uses that have occurred within the last several sentences, and uses that have occurred at any time at the customer site. Furthermore, the system may distinguish cases where the user intervened to indicate that a particular word sense should be used, from cases where the system used a particular word sense without any confirmation from the user.

The structural balance expert 182 is based on a characteristic of English and many other European languages pertaining to the lengths of constituents in a given sentence. In some (but not all) constructions, sentences which involve heavy (lengthy) elements to the left of light elements are disliked in these languages. For example:

> Mary hit Bill with a broom.
>     Light  Heavy
> {acceptable}
> Mary hit with a broom Bill.
>     Heavy        Light
> {unacceptable}
> Mary hit with a broom a dog that tried to bite her.
>     Heavy      Heavier
> {acceptable}

Given two parses of a given sentence, if one contains a "Heavy Light" sequence involving a construction that tends to avoid such a sequence, and if the other parse does not, then it can be assumed that the former does not represent the intended interpretation of the sentence. This expert is an effective way to distinguish between intended parses and unintended parses.

In coordinate structures of the pattern of "A of B and C" it can be difficult to determine whether the intended interpretation is "A of {B and C}" or "A {of B} and C". The coordinate structure expert 180 measures the semantic distance between B and C, and that between A and C to determine which mode of coordination combines two elements that are closer in meaning. This expert accesses the semantic feature tree during its operation. This expert is also an efficient way to distinguish between the intended parses and the unintended parses of a given sentence.

Many words in English include potential ambiguities between ordinary-noun and proper-name interpretations. The capitalization expert 176 uses the location of capitalization in a sentence to determine how likely it is that the capitalization is significant. For example, the following sentences:

Brown is my first choice.

My first choice is Brown.

are different in that while the former is genuinely ambiguous, it is far more likely in the latter that "Brown" is a person name than a color name. This expert takes into consideration factors such as whether a given capitalized word appears at sentence-initial or sentence-noninitial position (as shown above), whether the capitalized spelling is in the dictionary, and whether the lower-case-initial version is in the dictionary. This expert is an effective way to obtain the correct interpretations of capitalized words in sentences.

If a sentence contains a sequence of initial-uppercase words, it can be treated as a proper name or as a sequence of ordinary nouns. The system of the invention employs a capitalized sequence procedure, which favors the former interpretation. Also, if the sequence cannot itself be parsed by normal grammar rules, it can be treated as a single unanalyzed noun phrase to be passed through untranslated. This procedure has proven to be a very effective way of dealing with multiple-word proper names while not completely ignoring the lower-rated common noun interpretations.

Figure 7:
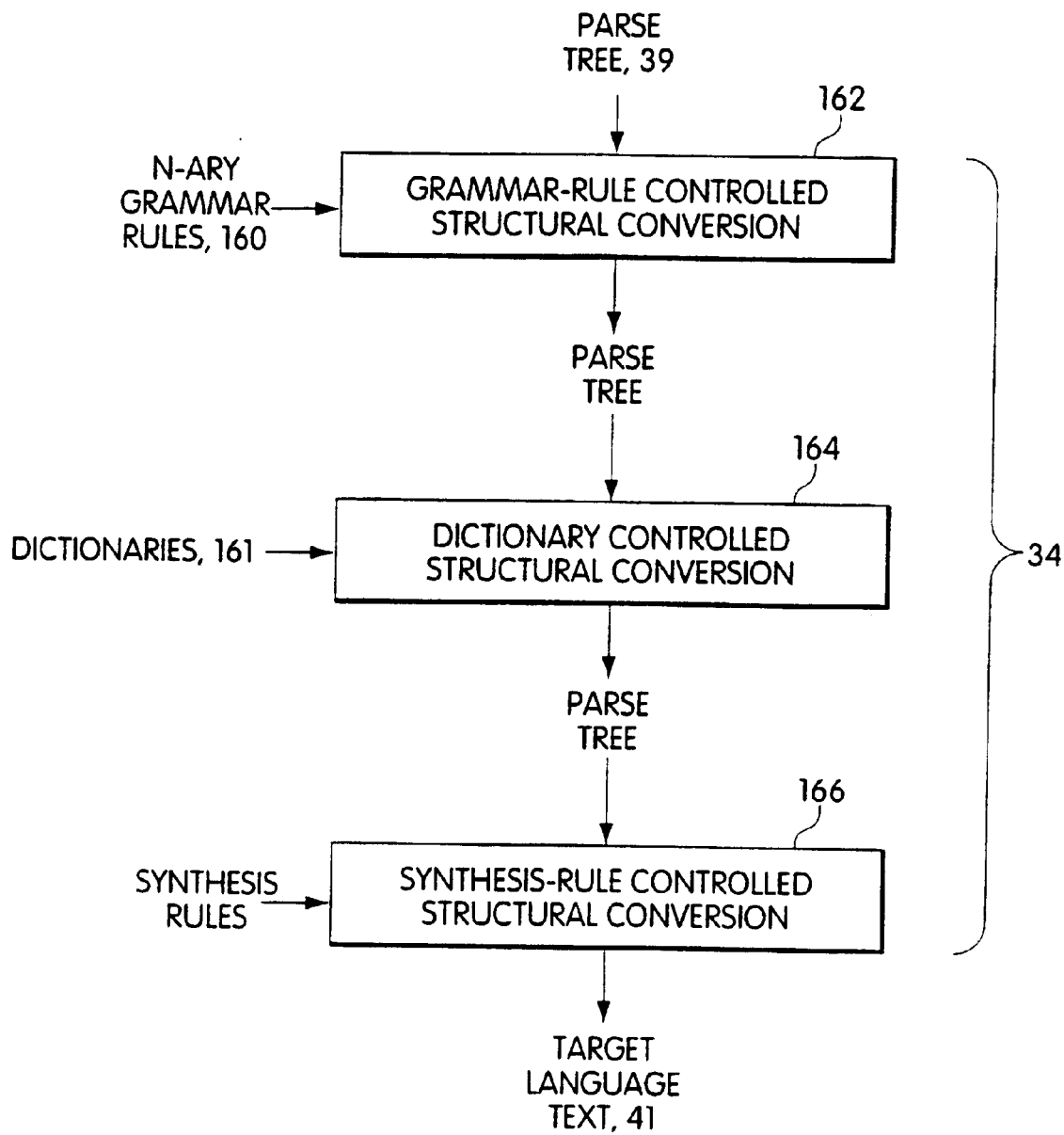
FIG. 7 is a flow diagram illustrating the structural conversion operations of the system of FIG. 1.

Referring to FIG. 7, the machine translation system of the invention uses a grammar-rule controlled structural conversion mechanism 162 that has the efficiency of a straightforward grammar-rule-based structural conversion method, but which comes close to the power of the template-to-template structural conversion method. This method relies on the use of grammar rules 160 which can specify non-flat complex substructure. While the following is a rule format used in other translation systems:

$$Y => X1 + X2 + \ldots Xn$$
Substructure Specified
$$Y$$
$$X2 \quad X2 \ldots Xn$$

the system of the invention uses grammar rules of the following format:

$$Y \Longrightarrow \#Z1(i) \; \#Z2(2) \; X1 + X2\ldots + Xi + X(i+1) +\ldots X(n)$$

Substructure Specified

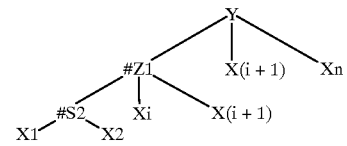

In this syntax, symbols prefixed with "#" are virtual symbols that are invisible for the purpose of sentence structure parsing, but which are used in building substructures once a given parse is obtained.

Given this type of grammar, it becomes possible to specify multiple structure conversion among any sequences of nodes that are siblings in the substructure. This transforms a grammar-rule-based structure conversion mechanism into one with some of the power of the template-to-template structure conversion mechanism. Although the system of the invention is based on the second type of grammar rules presented above, it automatically compiles the corresponding grammar rules of the first form. It can therefore use grammar rules of the first form to parse sentences, and use grammar rules of the second form to build parse structures.

The structural conversion also includes a dictionary controlled structural conversion operation 166, which accesses dictionaries 161 to operate on the parse tree after it has been operated upon by the grammar-rule controlled structural conversion operation. The synthesis-rule controlled structural conversion operation then applies synthesis rules to the resulting parse tree to provide the target language text 41.

Referring again to FIGS. 1 and 2, after the system has derived a best-ranked translation in the process described above, it is presented to the user via the display 20. The user then has the option of approving or editing the translation by interacting with the alternate parse system 37, via the user input device 22. In the editing operation, the user may constrain portions of the translated sentence that are correctly translated, while requesting retranslation of the remaining portions of the sentence. This operation may be performed rapidly, since the system retains the graph with expert weights 31.

Having described certain details of the automated natural language translation system with reference to FIGS. 1–9. Various improvements according to the invention are now described with reference to FIGS. 10, 11, and 12.

Figure 10:
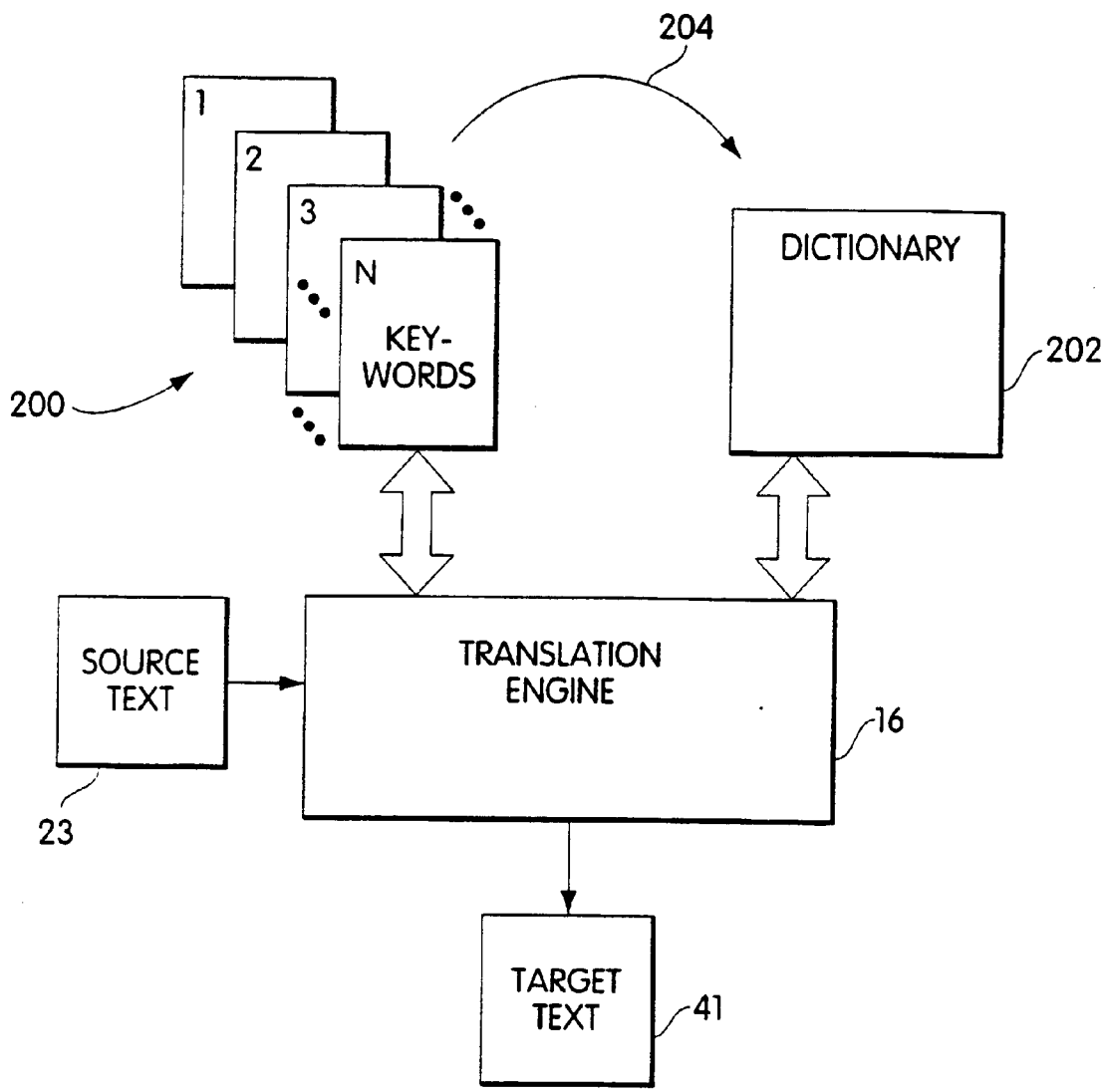
FIG. 10 is a diagram of an "automatic domain determiner" feature according to one aspect of the invention, as performed by the automated natural language translation system.

Referring to FIG. 10, the translation engine 16 of the automated natural language translation system 10 receives source text 23 and automatically translates it into target natural language text 41, which translation is affected by an "automatic domain determiner" feature according to one aspect the invention. Pursuant to this feature, the translation engine 16 accesses one or more lists (N are shown) of domain keywords 200 and a dictionary 202 when performing the translation. The dictionary 202 has entries that receive different translations depending upon the domain in which those entries are used. Each entry in the dictionary 202 can be one or more words in the source natural language. There generally is a list of domain keywords for each separate domain, and there are N domains shown in FIG. 10. Each entry in a list of keywords can be one or more words in the source natural language. The lists of keywords 200 can be separate from the dictionary 202, as shown, or incorporated into it, as indicated by an arrow 204.

A domain can include any set of terms and/or patterns of usage attributed to a certain field of usage or to one or more particular people. For example, a domain can include business correspondence, marketing documents, computer-related writings, writings in a technical field such as physics, etc.

The dictionary 202 contains certain words which, when used in the context of certain domains, have a translation in the target natural language (e.g., Japanese) which is different than it would be if the word(s) were used in another domain or if it was not used in any domain. The keywords 200 are domain-specific words or terms that are associated with each domain and are used to determine if a particular sentence in the source natural language 23 (or alternatively the whole source document) falls into one of the possible domains. Within each list of domain keywords 200, each keyword has a value associated with it that indicates its strength as a keyword for that particular domain. For example, a "computer" domain list might include the keyword "open-architecture computer" having a value of 100% which means that a sentence that contains the keyword is certain to be a sentence in the "computer" domain, and the keyword "computer" in the "computer" domain might have a value of 25% which means that it is less certain that a sentence with the keyword is in the "computer" domain.

With the "automatic domain determiner" feature, the translation engine 16 preferably determines the total strength value of the keywords (or, alternatively, it determines if there are enough keywords) in the sentence or whole document or some portion of the document to warrant a finding that the sentence or document falls within a particular domain. If it is within a domain, the translation of the sentence or the entire document is carried out using raised probability values of the words that are both listed in the dictionary 202 as domain-specific words and appear in the sentence or entire document being translated. The determination made by the translation engine 16 is based solely on the source natural language and the keywords.

The translation engine 16 can determine at least one domain to which at least a portion of the input textual information 23 belongs in, for example, either of the following two ways. The first way is by addressing each sentence in the input textual information 23 one at a time and counting the number of occurrences of each domain's keywords. For each domain having keywords equal to or above a predetermined number, the translation engine 16 raises the probability of certain words in the sentence being translated into the target natural language 41 using the translation specific to that domain. The predetermined number can be fixed for all sentences of the input textual information 23, or it can vary depending upon the length of (i.e., number of words in) each sentence. The predetermined number can be set by the system 10 or adjustable by a user of the system 10. The second way is by counting the number of occurrences of each domain's keywords appearing within a predetermined number of words of the input textual information 23, such as the first N words. For each domain having keywords equal to or above a predetermined number, the translation engine 16 raises the probability of certain words in the sentence being translated into the target natural language using the translation specific to that domain. As before, the predetermined value is either set by the system 10 or adjustable by a user of the system 10.

In a presently preferred embodiment, the translation engine 16 determines at least one domain to which at least a portion of the input textual information 23 belongs not by counting the keywords, as described in the preceding paragraph, but instead by utilizing the strength value associated with each keyword to produce a total strength value for each domain. In this preferred embodiment, the translation engine 16 otherwise operates as described in the preceding paragraph. That is, in a first preferred method, each sentence in the input textual information 23 is addressed one at a time and, for each domain having a total keyword strength value equal to or above a predetermined value, the translation engine 16 raises the probability of certain words in the sentence being translated into the target natural language 41 using the translation specific to that domain. The predetermined number can be fixed for all sentences of the input textual information 23, or it can vary depending upon the length of (i.e., number of words in) each sentence. The predetermined number can be set by the system 10 or adjustable by a user of the system 10. In a second preferred method, the total keyword strength value for each domain's keywords is determined by the keywords appearing within a predetermined number of words of the input textual information 23, such as the first N words of the source text 23. For each domain having a total keyword strength value equal to or above a predetermined value, the translation engine 16 raises the probability of certain words in the sentence being translated into the target natural language using the translation specific to that domain. As before, the predetermined value is either set by the system 10 or adjustable by a user of the system 10.

As an example of the "automatic domain determiner" feature, assume that "markup language" and "help desk" are included in the list of domain keywords for the domain "computers" and assume that "end users" has two separate translations depending upon whether "end users" is used in the domain "computers" or not. If the following sentence is part of the source text 23:

Markup language should be easily used by end users without being supported by help desk.

then, pursuant to the "automatic domain determiner" feature, the translation engine 16 will find two keywords in the domain "computers," namely "markup language" and "help desk." From these two hits in the domain "computers," the translation engine 16 might determine that the sentence is in the domain "computers" depending on the threshold set for making that determination. If the sentence is determined to fall within the domain "computers," the translation engine 16 will then raise the probability of the translation of "end users" that is specific to the domain "computers" to increase the chance of that domain-specific translation of "end users" making it into the target natural language text 41 presented to the user. Instead of working in this sentence-by-sentence mode, the "automatic domain determiner" feature can operate on a whole-text basis. For example, the translation engine 16 can determine if the entire source text 23 belongs to the domain "computers" if a certain number of keywords for a particular domain appear within the first "n" (where n is some integer value) words of the source text 23. In this whole-text mode, all words in the source text 23 that have domain-specific translations in the dictionary 202 will be translated using their domain-specific translations.

Figure 11:
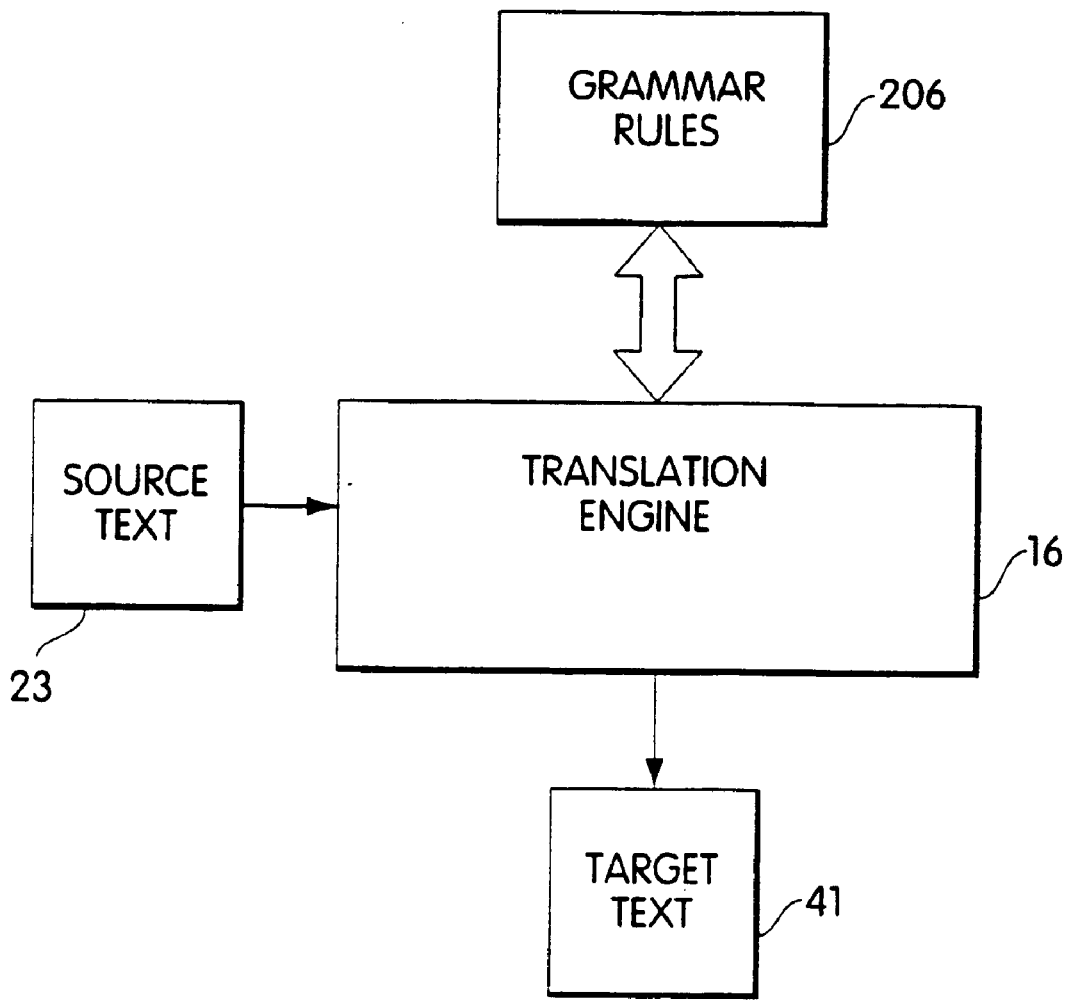
FIG. 11 is a diagram of a feature according to another aspect of the invention, as performed by the automated natural language translation system, which affects how the grammar rules are applied to the source text to be translated into the target natural language.

Referring to FIG. 11, the translation engine 16 of the automated natural language translation system 10 receives source text 23 and automatically translates it into target natural language text 41, which translation is affected by certain designations or markings applied to various ones of the grammar rules 206 in accordance with another aspect of the invention. The designations are "almighty" and "POS-Exclusive," where POS stands for "part(s) of speech." The translation engine 16 of the system 10 has a parser 26 which parses sentences of the source natural language 23 using grammar rules 206 which can be marked as "almighty" and "POS-Exclusive." The parser 26 uses a grammar rule marked as "almighty" as a rule that blocks all other rules for any part of the source natural language 23 to which the almighty rule applies. The parser 26 uses a grammar rule marked as "POS-Exclusive" as a rule that blocks only those other rules associated with the same particular POS in question. An unmarked grammar rule has no priority over any other rules. Marking grammar rules as either "almighty" or "POS-Exclusive" is a very effective way to prune unnecessary parsing branches from the tree structure that would otherwise be created by the system's translation engine 16. This marking of grammar rules also makes parsing more efficient in terms of both time and storage requirements in that the translation engine 16 does not have to create as large a tree structure as it might otherwise and the translation engine 16 does not need to store as big a tree structure as it might otherwise.

As an example of this grammar rule marking feature, assume the grammar rules include the following three rules:

(1) Noun=Number+Hyphen+ORDINALhundred (e.g., three-hundredth)
(2) Noun=Noun+Hyphen+Noun (e.g., school-building)
(3) NounPhrase=Number+Noun (e.g., one book)

Also assume that the system 10 uses a dictionary that contains the following three entries:

| one | Number |
| | Noun |
| eighteen | Number |
| | Noun |
| hundredth | ORDINALhundred |
| | Noun |

Given these grammar rules and these dictionary entries, the source text string "one eighteen-hundredth" is parsable in the following two ways:

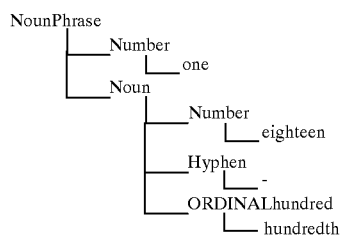

-continued

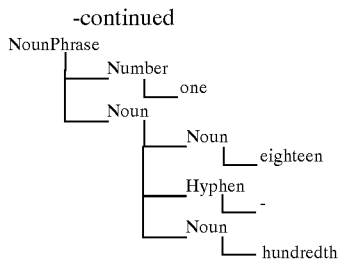

If grammar rule (1) is marked as "almighty," then the first of these two parsings will be used because all other parsings (like the second parsing above) of the string "one eighteen-hundredth" are ruled out. Almighty rule (1) is used because it dominates all other rules. If grammar rule (1) is instead marked as "POS-Exclusive," the first parsing is again chosen over the second parsing, but this time it is because rule (1) and rule (2) address the same POS and, with rule (1) marked as controlling (i.e., POS-Exclusive), it will be used instead of rule (2) to parse the string. As the next example points out, "almighty" and "POS-Exclusive" are separate and a rule marked as "almighty" will not always yield the same result if the rule is instead marked as "POS-Exclusive."

Assume the following four grammar rules, where the third rule is marked as "POS-Exclusive":

(1) Noun=Noun+Noun
(2) NounPhrase=Noun
(3) NounPhrase=Number+Noun {POS-Exclusive} (e.g., in FOUR DAYS)
(4) AdvPhrase=Number+AdvNoun (e.g., I work FOUR DAYS a week)

Also assume that the system 10 uses a dictionary that contains the following entry:

| days | Noun |
| | AdvNoun |

Given these grammar rules and this dictionary entry, the source text string "I work four days" is parsable in the following three ways and the phrase level:

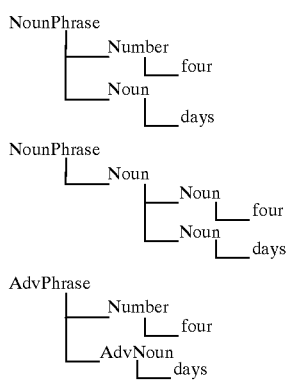

With grammar rule (3) being marked as "POS-Exclusive," the first of these three parsings will be used over the second parsing because rule (3) blocks application of any other grammar rules that parse the same string ("four days") as the same POS, NounPhrase, and rule (2) would have parsed "four days" as a NounPhrase. The third parsing above, however, is not discarded because it has a POS category, AdvPhrase, which is different than NounPhrase. Thus while marking rule (3) as "almighty" would have resulted in no other rules except rule (3) being applied, marking it as "POS-Exclusive" excludes only other rules addressing the same POS as rule (3).

Figure 12:
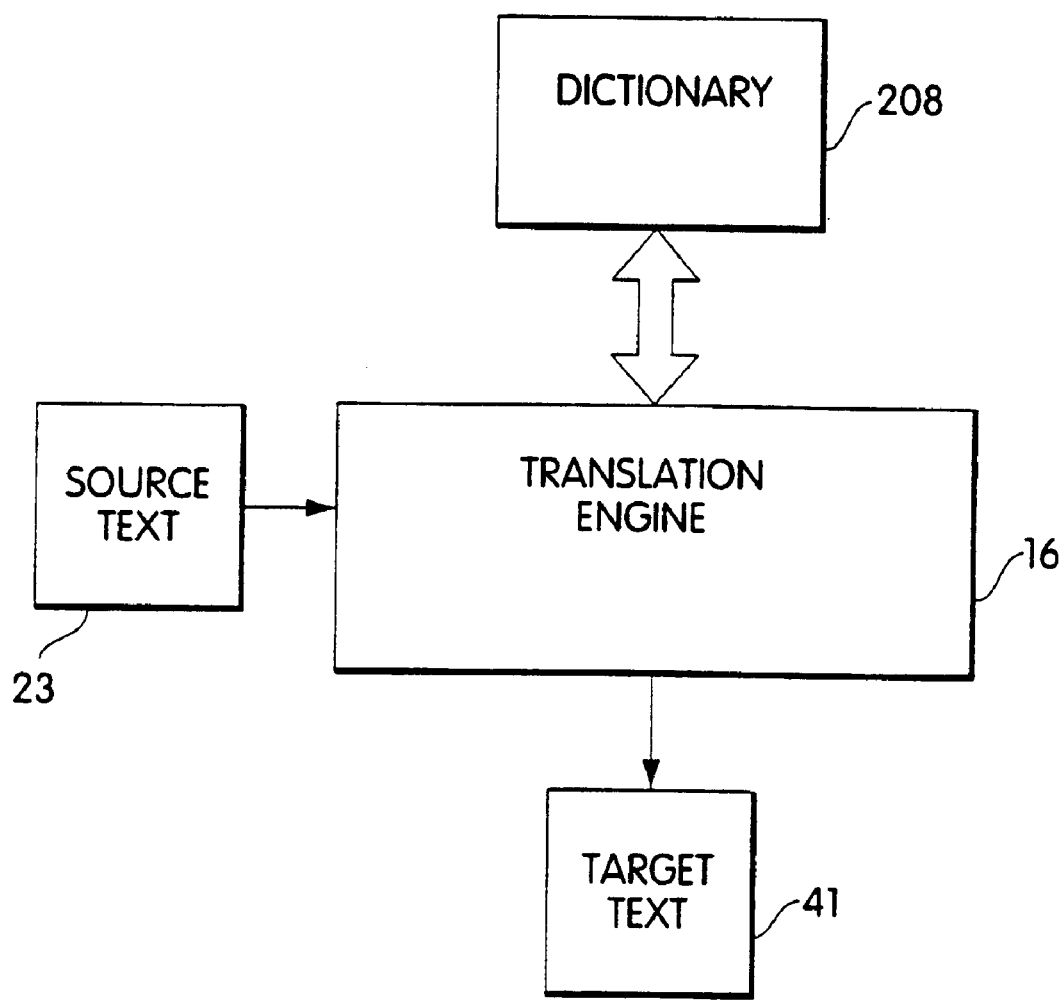
FIG. 12 is a diagram of a feature according to yet another aspect of the invention, as performed by the automated natural language translation system, which involves associating probability values with dictionary entries to eliminate undesirable translations.

Referring to FIG. 12, the translation engine 16 of the automated natural language translation system 10 receives source text 23 and automatically translates it into target natural language text 41, which translation is affected by probability values associated with certain dictionary entries according to yet another aspect of the invention. According to this probability feature, a parser 26 of the translation engine 16 uses a dictionary 208 having entries marked as highly or absolutely unlikely to be constituents of the final tree structure. The dictionary 208 has multi-word entries, and at least one of those entries is marked with an extremely low probability value which indicates that it is least likely that the entry should function as the specified part of speech (POS) in the correct parse tree of any sentence in the source natural language 23. When the marked entry appears in a parse tree structure of a given input sentence, the probability of that parse tree being the correct one for the sentence is greatly reduced because of the low probability value associated with that marked entry. This use of probability values can have a pruning effect on the tree structure created by the translation engine 16 of the system 10.

As an example of the use of probability values, assume a dictionary that contains the following multi-word entry:

| Entry | POS | Rule | Probability |
| --- | --- | --- | --- |
| in today | PrepositionalPhrase | POS-Exclusive | P(n) | where P(n) represents an assumed probability that the entry "in today" in a given source text sentence is in fact a PrepositionalPhrase. Assume that P(n) is set at a value that is infinitesimally small compared to regular multi-word entries in the dictionary. The following is the source text input sentence:

He didn't come in today.
and it is syntactically ambiguous between
He didn't {come in} today.
and
He didn't come {in today}.

The probability of this second parsing of the sentence is greatly reduced because {in today} matches an entry in the dictionary with its associated infinitesimal probability value, P(n). Because "in today" is marked as "POS-Exclusive," there is no other parsing of {in today} as a PrepositionalPhrase that could contribute a regular probability value to the parsing. in this way, the undesirable parses of the sentence are down-graded. If P(n) for "in today" is set at zero, the parser may not use "in today—PrepositionalPhrase" at all for parsing of the sentence, but for this particular example, it is not desirable to set P(n) to zero because of source text sentences such as:

I am interested in today, and not in tomorrow.
where it is desirable to parse "in today" as a PrepositionalPhrase. Using a low P(n) instead of zero can result in a pruning of the undesirable parse
He didn't come {in today}.
while keeping
I am interested in today, and not in tomorrow.
as correctly parsable so that "in today" is parsed as a PrepositionalPhrase.

All of the above-described functions and operations may be implemented by a variety of hardwired logic design and/or programming techniques for use with a general purpose computer. The steps as presented in the flowcharts generally need not be applied in the order presented, and combinations of the steps may be combined. Similarly, the functionality of the system may be distributed into programs and data in various ways. Furthermore, it may be advantageous to develop the grammar and other operative rules in one or more high level languages, while supplying them to end users in a compiled format.

Any of the embodiments of the automated natural language translation system described herein, including all of the finctionality described herein, can be provided as computer software on a computer-readable medium such as a diskette or an optical compact disc (CD) for execution on a general purpose computer (e.g., an Apple Macintosh, an IBM PC or compatible, a Sun Workstation, etc.).

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. An automated natural language translation system, comprising:

computer storage means;

means for receiving input textual information in a source natural language and for storing the input textual information in the computer storage means;

a plurality of keywords for at least one domain, the keywords for each domain being stored in the computer storage means;

a dictionary including a plurality of words wherein at least some of the words have translations in a target natural language which are different depending on the domain in which those words are used, the dictionary being stored in the computer storage means; and a translation engine for accessing the computer storage means and for translating the input textual information in the source natural language into output textual information in the target natural language, the translation engine creating and using a tree structure in performing the translation, the translation engine determining at least one domain to which at least a portion of the input textual information belongs by addressing each sentence in the input textual information one at a time and altering the probability of certain words in a sentence being translated into the target natural language with a translation specific to a particular domain based on at least one of the keywords.

2. An automated natural language translation system, comprising:

computer storage means;

means for receiving input textual information in a source natural language and for storing the input textual information in the computer storage means;

a plurality of grammar rules stored in the computer storage means, at least one of the grammar rules being designated as a controlling grammar rule which blocks all of the other grammar rules for any portion of the input textual information to which the controlling grammar rule applies; and a translation engine for accessing the computer storage means and for translating the input textual information in the source natural language into output textual information in a target natural language, the translation engine creating and using a tree structure in performing the translation, the translation engine including a parser for applying the grammar rules to the input textual information and for ignoring all other grammar rules for a portion of the input textual information when the controlling grammar rule applies to that portion of the input textual information.

3. An automated natural language translation system, comprising:

computer storage means;

means for receiving input textual information in a source natural language and for storing the input textual information in the computer storage means;

a plurality of grammar rules stored in the computer storage means, each of at least some of the grammar rules being associated with one of a plurality of predetermined parts of speech (POS), at least one of the grammar rules associated with one of the predetermined POS being designated as a controlling grammar rule which blocks all of the other grammar rules associated with that predetermined POS for any portion of the input textual information to which the controlling grammar rule applies, and a translation engine for accessing the computer storage means and for translating the input textual information in the source natural language into output textual information in a target natural language, the translation engine creating and using a tree structure in performing the translation, the translation engine including a parser for applying the grammar rules to the input textual information and for ignoring all other grammar rules associated with one of the predetermined POS for a portion of the input textual information when the controlling grammar rule associated with that predetermined POS applies to that portion of the input textual information.

4. An automated natural language translation system, comprising:

computer storage means;

means for receiving input textual information in a source natural language and for storing the input textual information in the computer storage means;

a dictionary including a plurality of multi-word entries wherein at least one of the multi-word entries being a marked entry which has associated therewith a value indicating the likelihood the marked entry will be translated into a target natural language as a particular part of speech, the dictionary and the values being stored in the computer storage means; and a translation engine for accessing the computer storage means and for translating the input textual information in the source natural language into output textual information in the target natural language, the translation engine creating and using a tree structure in performing the translation, the translation engine including a parser which is more or less likely to parse the marked entry appearing in a sentence of the input textual information as the particular part of speech depending on the value associated with the marked entry.

* * * * *